(12) United States Patent
Gutsche

(10) Patent No.: US 7,529,764 B2
(45) Date of Patent: May 5, 2009

(54) GUI FOR DATA PIPELINE

(75) Inventor: Ralf Gutsche, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 672 days.

(21) Appl. No.: 10/756,123

(22) Filed: Jan. 12, 2004

(65) Prior Publication Data

US 2005/0154729 A1 Jul. 14, 2005

(51) Int. Cl.
*G06F 17/30* (2006.01)
*G06F 7/00* (2006.01)

(52) U.S. Cl. ............ 707/102; 707/101; 707/104.1

(58) Field of Classification Search ......... 707/1–2, 707/100, 102, 104.1, 200; 709/230–232, 709/200; 717/141–142, 118, 160, 149, 104–105, 717/110–111; 714/38; 715/765, 747, 762, 715/825, 735–737, 763; 712/1

See application file for complete search history.

(56) References Cited

U.S. PATENT DOCUMENTS

| | | | | |
|---|---|---|---|---|
| 5,384,911 | A * | 1/1995 | Bloomfield | 715/746 |
| 5,937,415 | A | 8/1999 | Sheffield et al. | 707/204 |
| 6,031,533 | A * | 2/2000 | Peddada et al. | 715/733 |
| 6,054,983 | A * | 4/2000 | Simonoff et al. | 715/738 |
| 6,067,542 | A | 5/2000 | Carino, Jr. | 707/4 |
| 6,208,990 | B1 | 3/2001 | Suresh et al. | 707/6 |
| 6,226,783 | B1 * | 5/2001 | Limondin et al. | 717/104 |
| 6,252,591 | B1 * | 6/2001 | Dockweiler et al. | 715/744 |
| 6,307,574 | B1 * | 10/2001 | Ashe et al. | 715/765 |
| 6,311,151 | B1 * | 10/2001 | Yamamoto et al. | 704/8 |
| 6,327,587 | B1 | 12/2001 | Forster | 707/2 |
| 6,339,775 | B1 | 1/2002 | Zamanian et al. | 707/101 |
| 6,342,907 | B1 * | 1/2002 | Petty et al. | 715/762 |
| 6,449,619 | B1 | 9/2002 | Colliat et al. | 707/102 |
| 6,499,036 | B1 | 12/2002 | Gurevich | 707/103 R |
| 6,549,910 | B1 | 4/2003 | Tate | 707/102 |
| 6,553,366 | B1 | 4/2003 | Miller et al. | 707/2 |
| 6,633,888 | B1 * | 10/2003 | Kobayashi | 707/103 R |
| 6,636,860 | B2 | 10/2003 | Vishnubhotla | 707/100 |
| 6,668,284 | B1 * | 12/2003 | Parkhurst | 719/313 |
| 6,708,164 | B1 | 3/2004 | Cseri et al. | 707/4 |
| 6,731,310 | B2 * | 5/2004 | Craycroft et al. | 715/765 |
| 6,760,888 | B2 * | 7/2004 | Killian et al. | 716/1 |
| 6,782,508 | B1 * | 8/2004 | Bahrs et al. | 715/526 |
| 6,789,096 | B2 | 9/2004 | Sankaran et al. | 707/203 |

(Continued)

FOREIGN PATENT DOCUMENTS

EP 0798655 * 10/1997 ............. 17/30

(Continued)

OTHER PUBLICATIONS

David E Rex et al. "the LONI Pipeline Processing environment", science direct, NeroImage 19,2003, pp. 1033-1048.*

(Continued)

*Primary Examiner*—Kuen S Lu
(74) *Attorney, Agent, or Firm*—John L. Rogitz

(57) ABSTRACT

A graphical user interface (GUI) for a Pipeline architecture includes providing a way for generating and modifying Pipelines without writing any JAVA code apart from an initial core code.

6 Claims, 17 Drawing Sheets

U.S. PATENT DOCUMENTS

| | | | |
|---|---|---|---|
| 7,007,029 B1 | 2/2006 | Chen | 707/100 |
| 7,224,373 B1* | 5/2007 | Duarte et al. | 345/659 |
| 7,266,766 B1* | 9/2007 | Claussen et al. | 715/234 |
| 2002/0078015 A1 | 6/2002 | Ponnekanti | 707/1 |
| 2002/0078251 A1* | 6/2002 | Lewis | 709/314 |
| 2003/0088565 A1* | 5/2003 | Walter et al. | 707/6 |
| 2003/0159130 A1* | 8/2003 | Broussard et al. | 717/120 |
| 2003/0210275 A1* | 11/2003 | Draschwandtner et al. | 345/810 |
| 2004/0015832 A1* | 1/2004 | Stapp et al. | 717/106 |
| 2004/0015852 A1* | 1/2004 | Swetland | 717/118 |
| 2004/0015934 A1* | 1/2004 | Muthukumar et al. | 717/160 |
| 2004/0036719 A1* | 2/2004 | Van Treeck | 345/763 |
| 2004/0095386 A1* | 5/2004 | Flynn et al. | 345/762 |
| 2004/0103073 A1* | 5/2004 | Blake et al. | 707/1 |
| 2004/0117427 A1* | 6/2004 | Allen et al. | 709/200 |
| 2004/0139214 A1* | 7/2004 | Hinshaw et al. | 709/231 |
| 2004/0186915 A1* | 9/2004 | Blaszczak et al. | 709/246 |
| 2005/0154696 A1* | 7/2005 | Gutsche | 707/1 |

FOREIGN PATENT DOCUMENTS

| | | | | |
|---|---|---|---|---|
| EP | 1100239 | * | 5/2001 | 17/30 |
| EP | 1439464 | * | 7/2004 | 9/44 |
| WO | WO 2006/014372 | * | 2/2006 | |

OTHER PUBLICATIONS

Walamitien Oyenan, "graphical user interface and Job distribution optimizer for a virtual pipeline simulation testbed", 2003.*

LONI Pipeline,Laboratory of Neuro Imaging Pipeline environment, v1.0.3 2001, pp. 1-16.*

Sudeep Pasricha et al. "a framework for GUI-driven design space exploration of a MIPS4K-like processor", CECS Technical report 03-17, Apr. 2003 pp. 1-26.*

Erwan Reguer et al. "a softare pipeline dedicated to automatic MS/MS data analysis" 3 pages no date.*

Chris Weaver et al. "performance analysis using pipeline visualization", no date.*

Henry S thompson, "Re-Interpreting the XML pipeline note:",proceedings by deepX ltd.XML 2003 conference proceedings.*

Davis,L.E, "The ALMA prototype science pipeline", no date.*

Separable model architecture, J2Geek, Oct. 2003.*

Milan Frank et al. "pipeline approach used for recognition of dynamic meshes", no date.*

Fred Iong et al. "a comparison of component integration between JavaBeans and PCTE", no date pp. 1-7.*

Andrew Harrison et al. "service-oriented middleware for hybrid environments", ADPUC '06 ACM 2006.*

* cited by examiner

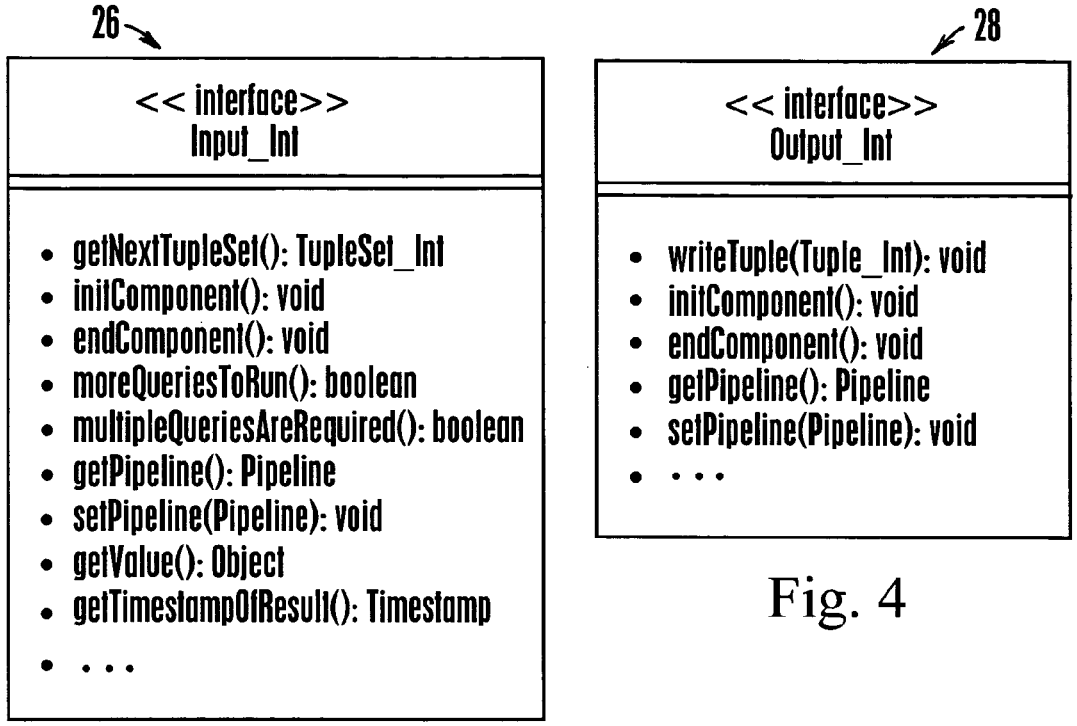
Fig. 3
Fig. 4
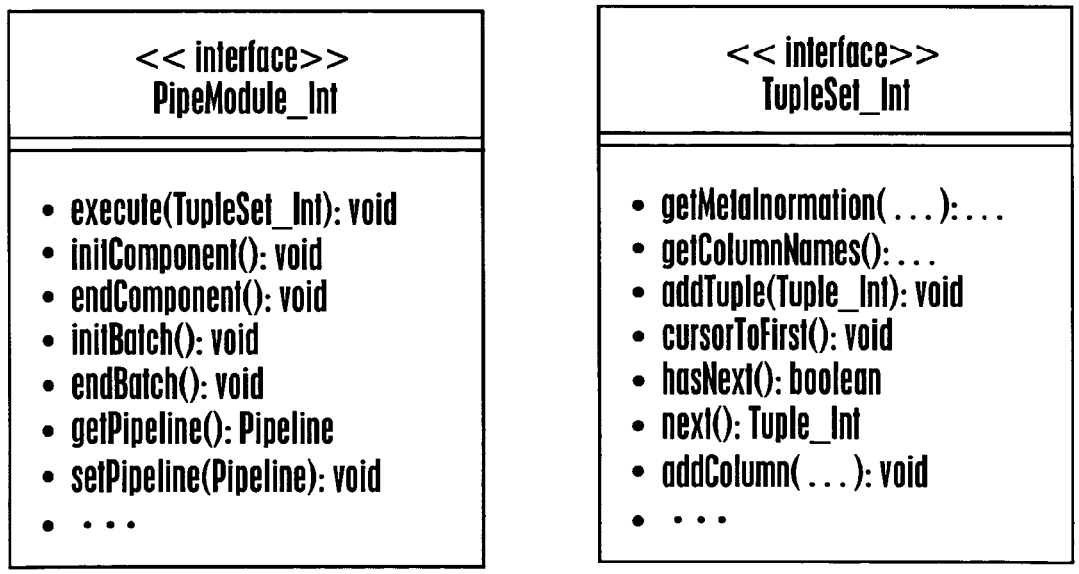
Fig. 5
Fig. 6

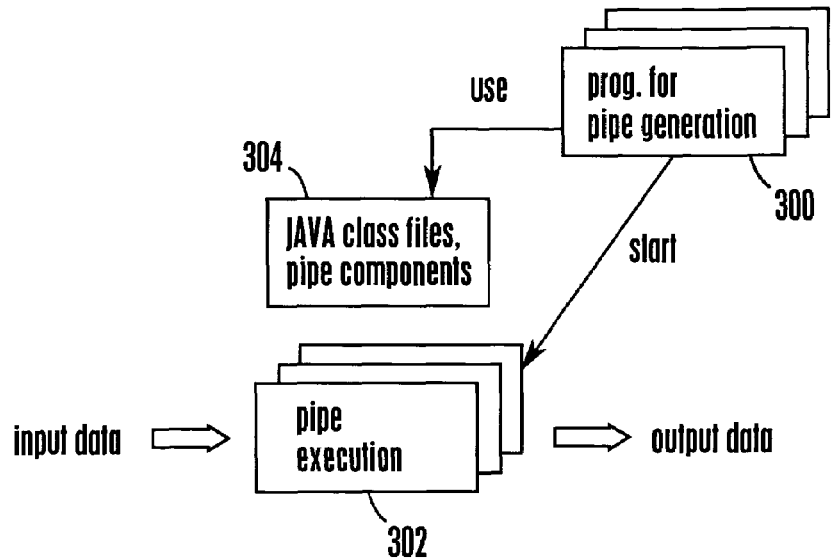
Fig. 11 Pipe Definition/Execution -- Code Level
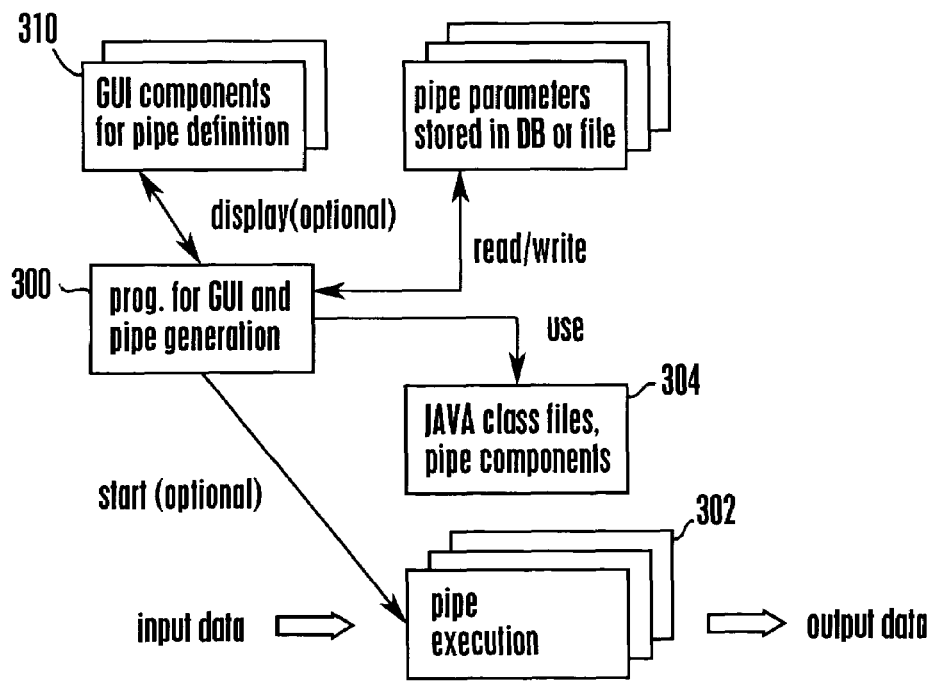
Fig. 12 Pipe Definition/Execution -- GUI Level

| SQL Column Definition | Column Name in AttachedTupleSet | Condition | Comment |
|---|---|---|---|
| N | | | |
| MEAN | | | |
| SIG2 | | | |
| SX | | | |
| SX2 | | | |
| MINVAL | | | |
| MAXVAL | | | |
| MINTIME | | | |
| MAXTIME | | | |
| THISSTORETIME | | | |

Add more

Key Column umn

| SQL Column Definition | Column Name in AttachedTupleSet | Condition | Comment |
|---|---|---|---|

Fig. 21 continued

GUI FOR DATA PIPELINE

FIELD OF THE INVENTION

The present invention relates generally to data summarization systems.

BACKGROUND

In computerized applications such as warehousing large amounts of data that might be continuously generated as a result of, e.g., large scale manufacturing processes, grocery store sales, and the like, it is essential to provide some way to present summaries of the data. The summaries may have to be presented periodically, e.g., daily. To present such summaries, a large amount of raw data must be processed. So-called data "pipelines" have been provided for this purpose.

Essentially, a data pipeline is a collection of software modules, each one of which executes a particular operation or sequence of operations on data that passes through it. The modules typically are arranged in series, i.e., a first module receives the raw data stream, processes it, and then sends its output to the next module down the line. The last module typically is an output module.

Because data summarization requirements vary widely depending on the particular application, current pipeline architectures are specifically designed to meet the demands of whatever application happens to be envisioned. Ordinarily a pipeline can't be used for an application it was not designed for. This is because each pipeline has constraints that are unique to its application, e.g., how to filter outlier data points, how to summarize by group, even what input and output streams are to be involved.

Consequently, because of the above considerations it is difficult to provide an open pipeline architecture that is flexible and easily configured for more than a set of applications. While some pipeline architectures might permit using standard libraries, they are time-consuming to develop, require individual debugging, module by module, and tend to be difficult to maintain, since information such as SQL query statements are embedded in the pipeline code, and each programmer tends to have his or her own style. Moreover, pipelines such as UNIX are restricted to one input and one output, further decreasing the flexibility of the architecture. Still further, most if not all pipelines require the modules to work in series, as mentioned above, but as recognized herein it is sometimes desirable that a particular module process only a portion of a stream of data without having to sort through the entire stream.

In addition to the above, the present invention recognizes that existing pipelines suffer additional disadvantages. Among them is that the interfaces that connect modules to the pipe are either not defined or are too restrictively defined to be flexible for more than a set of applications. Also, existing pipelines envision data flow in one direction—input to output—which renders them incapable of certain summarization tasks, such as incremental mean computation which requires access to previously computed means from the output of the pipe. Recognizing the above drawbacks, the solutions herein to one or more of them are provided.

SUMMARY OF THE INVENTION

A graphical user interface (GUI) for configuring pipelines that is displayable on a user computer monitor includes at least one pipe input set window configured to permit a user to define a type of pipe input set data. The GUI also includes at least one GUI page based on the type, with the GUI page being generated by translating the type using a configuration file to a class and using Java reflection to generate an instance of the class. The instance produces the GUI page.

In a non-limiting embodiment at least the pipe input set window and GUI page require no programming apart from an initial core code. If desired, the GUI may be an incremental GUI wherein GUI pages for new pipe modules can be added incrementally without changing existing code.

As set forth further below, in one preferred non-limiting embodiment the GUI defines a set of interfaces. Each interface includes plural functions, and the GUI includes a GUI representation part and a storage part. The GUI representation part defines how something is displayed and the storage part defines how GUI parameters are stored in an external storage.

As also discussed below in relation to the preferred non-limiting embodiment, a Pipe Output Set tab can be provided for defining a PipeOutputSet representative of a type of output data from the pipeline. Also, if desired a Storage For TupleSets tab can be used for defining an arbitrary number of elements contained in a StorageForTupleSets component of the pipeline, with individual input and output sets being definable for each element in the component. Also, in preferred non-limiting implementations a Pipe Modules tab can be used for defining an arbitrary number of PipeModules of the pipeline. A type is selected for each PipeModule using the tab, the type defining at least in part the GUI.

Users of the GUIPipe can write/program their own GUIComponents and PipeComponets (implementing the appropriate interfaces) and compile them. And, users can make these components (e.g., processing modules, input and output modules) available inside the GUI by changing only a configuration file—no editing/compilation of existing code is necessary. Thus, users can extend the functionality of the pipeline by adding new component types, which entails encoding the interfaces using JAVA code and adding the new object type to the configuration file. In addition, users can generate arbitrary pipelines using already programmed components (known types) by parameterizing them via the GUI, which does not include any new JAVA programming. In either case, the core JAVA code of the underlying pipeline does not require modification; instead, at most the configuration file is updated with a new component type but owing to JAVA reflection no recompilation is necessary.

In another aspect, a graphical user interface (GUI) for a Pipeline architecture includes means for generating and modifying Pipelines without writing any JAVA code apart from an initial core code.

In yet another aspect, a method for generating a pipeline for processing data from at least one data store includes presenting a main GUI window and using the main GUI window to access an initial core code. The method also includes using the main GUI window to access at least one subsequent GUI window. Without generating further code, the subsequent GUI window is used to configure the pipeline at least in part.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 shows the tuple input set interface;
FIG. 4 shows the tuple output set interface;
FIG. 5 shows the pipeline processing module interface;

FIG. 6 shows the tuple set interface;

FIG. 11 is a block diagram illustrating the CodeLevelPipeline concept;

FIG. 12 is a block diagram illustrating the GUILevelPipeline concept;

DETAILED DESCRIPTION OF THE PREFERRED EMBODIMENT

Figure 1:
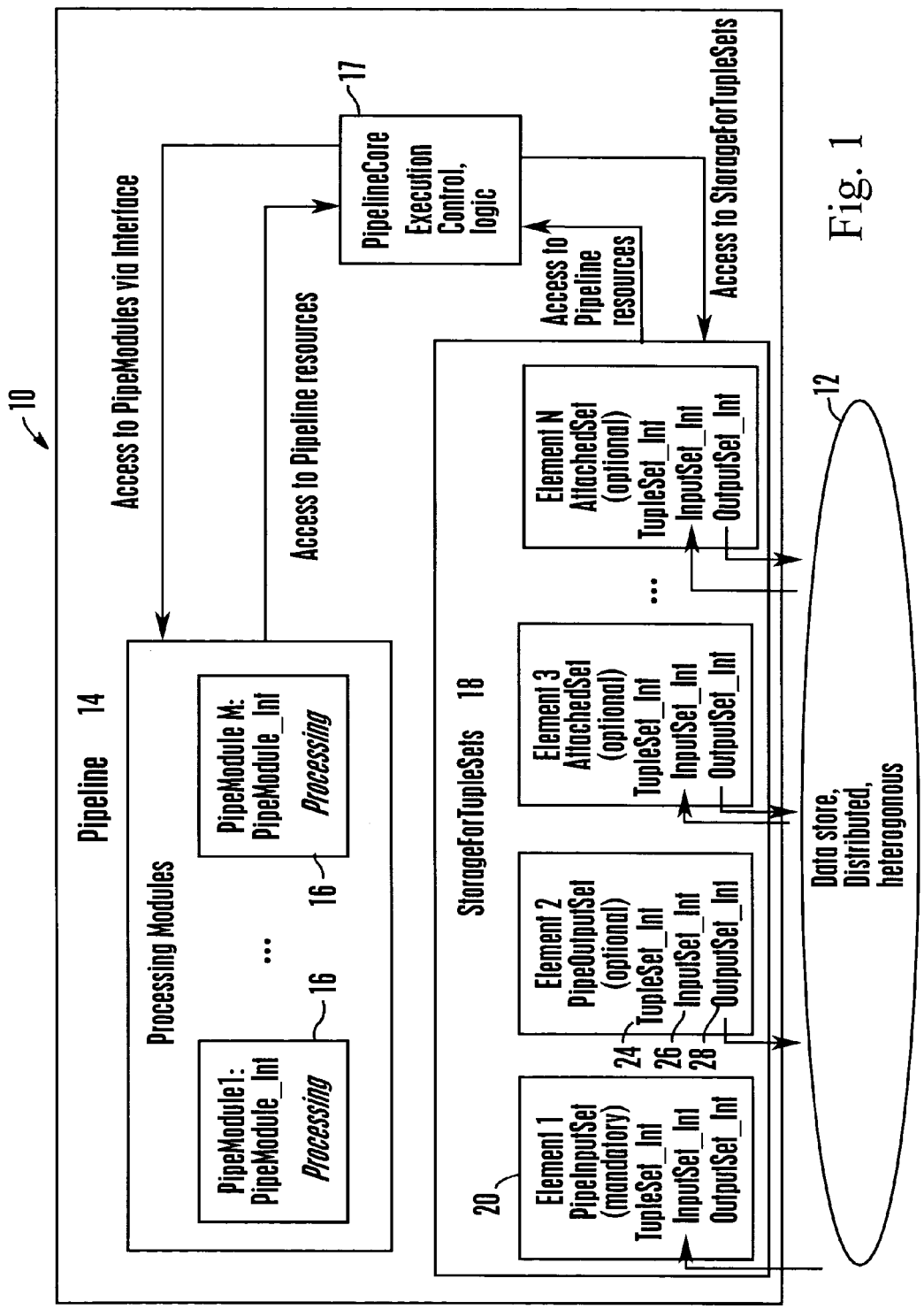
FIG. 1 is a block diagram of the present pipeline system.

Referring initially to FIG. 1, a pipeline system is shown, generally designated 10, for processing data from a data store 12. The data store 12 contains raw data records that are processed, preferably incrementally, by a pipeline 14 with associated processing modules 16 (only two processing modules 16 shown in FIG. 1, although greater or fewer processing modules can be used). The pipeline 14 can communicate with the processing modules 16 through a pipeline core logic module 17 that contains execution and control logic. The data store can also contain data output from the pipeline, potentially summarized data, as well as intermediate data. The data store 12 may be, e.g., a relational database, in which case the data elements can be referred to as "tuples", or it can be a file system, operating system pipe, or other source of data. Accordingly, while the disclosure below refers to "tuples" and assumes a database-centric system, it is to be understood that the principles set forth herein are not limited to databases. Moreover, the present pipeline can draw data from heterogenous sources, e.g., from one or more potentially different RDBMS and from a file system.

In general overview, the pipeline 14 uses a storage for tuple sets module 18 (hereinafter also referred to as "StorageForTupleSets") that in turn has one or more elements 20 for causing tuples to be processed by the processing modules 16. Essentially, the pipeline 14 issues calls as appropriate to cause the various components to process the tuples. The components are attached to what might be thought of as a frame of the pipeline through standard interfaces that are discussed more fully below, so that new processing modules can be easily added to the pipeline without requiring code changes. Among other things discussed below, the preferred interfaces permit transaction-based processing, incremental processing, and triggers (for initialization and clean up during beginning and ending of a pipeline batch).

The tuples to be processed are drawn from the data store one set of tuples ("PipeTupleSet") at a time, preferably in timestamp order, and each tuple is pumped thru all processing modules 16. The entire pipeline system 10 can be implemented in the memory of a computer. However, the modules 16 need not process every tuple, but instead, owing to the below-discussed interfaces, can filter data by picking selected rows and columns. Still further, a processing module 16 may add a column. Also, for, e.g., computing a running mean, a module 16 can also access its own output or another output to maintain a running mean, so that, for instance, a mean price of goods through a particular day of the week can be updated in light of new data collected the following day. Other tasks can include sending an email, computing a minimum, computing a maximum, and generating a histogram. All input/output is managed by the StorageForTupleSets 18 of the pipeline 14, so that a processing module 16 can request elements from the pipeline to, e.g., facilitate sharing of data and processed results among the processing modules. Accordingly, it may be appreciated that the non-limiting interfaces can permit content based-processing to, e.g., share data between modules to enable incremental computation to, e.g., access the correct mean tuple in external storage using group columns as content-based access columns.

With the above general overview in mind, additional details of the pipeline system 10 shown in FIG. 1 may be better understood. The StorageForTupleSets 18 is a data object from a storage for tuple sets data class that can contain one or more elements 20, each of which is an object from a storage element data class. The StorageForTupleSets 18 is responsible for all data that is used/accessed/transported in the pipeline, and it can support any number of elements 20. As shown in FIG. 1, each element 20 has a memory representation referred to herein as "TupleSet_Int" and shown at 24 in FIG. 1. Each element 20 also optionally has an input interface 26 and an output interface 28, discussed further below. The latter two interfaces manage the mapping between the pipeline and the data store 12. Each processing module 16 can access resources of the pipeline using a pipeline reference.

As shown in FIG. 1, among the elements 20 of the storage for tuple sets module 18 is a mandatory PipeInputSet and an optional PipeOutputSet. The PipeInputSet object includes the tuple set interface (TupleSet_Int) 24 and a data input interface (Input_Int) 26 that is a mapping from the data store 12 to the pipeline system 10. By calling a method referred to as "getNextTupleSet" (see below) on the PipeInputSet object 20 the next tuple set for processing is generated. This TupleSet_Int relates to a "PipeTupleSet", and the PipeTupleSet is pumped through the PipeModules 16.

When provided, the optional pipe output set (PipeOutputSet) can write the PipeTupleSet back to the data store 12 using the output interface (Output_Int) 28. Further elements 20 can be configured as appropriate to read and/or write data to data stores to, e.g., support content-based access, as mentioned above.

Figure 2:
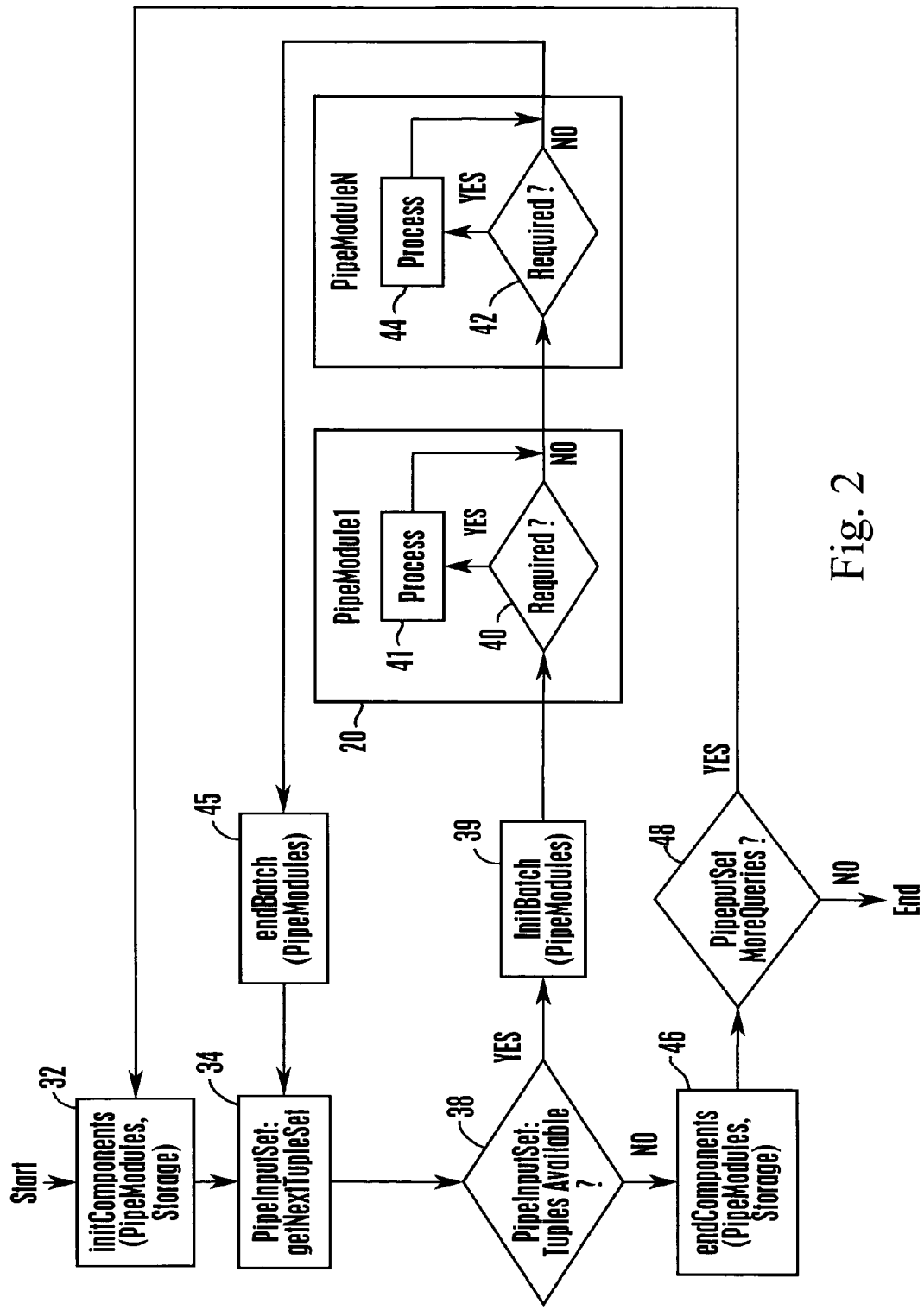
FIG. 2 is a flow chart of the pipeline process.

With the above in mind, reference is now made to FIG. 2. Commencing at block 32, the pipeline 14 initializes the pipeline components, including the processing modules 16, StorageForTupleSets, etc. Next, at block 34 the next tuple set (PipeTupleSet) from the PipeInputSet is obtained starting with, e.g., the tuple set having a time stamp immediately following the last-processed tuple set. That is, the last-processed time stamp (from, e.g., a previously completed run) can be read for this purpose, so that the tuple with the next timestamp can be pulled at initialization by appropriately configuring an SQL SELECT command. The processing modules 20 can be initialized by, e.g., reading appropriate configuration parameters from external tables.

At decision diamond 38 it is determined by the pipeline core 17 whether a PipeTupleSet set is available. If so, the process moves to block 39 to initialize the batch for the pipe modules 20. Proceeding to decision diamond 40, it is determined by the first processing module 20, based on the parameters of the module, whether the tuple is required for processing. If it is, the module processes the tuple at block 41. In the event that the module requires additional data, e.g., to update a previously computed mean, the module requests the appropriate element of the StorageForTupleSets from the pipeline and requests the correct tuple from this element specifying the required content/condition.

From block 41 or from decision diamond 40 if the test there was negative, the logic proceeds to decision diamond 42 and block 44 essentially as described above for steps 38 and 40. In the event that additional processing modules are provided, each one receives the tuple in sequence and determines whether it can use the tuple and if so, to process it.

After the tuple set has been processed by all processing modules 16, the logic moves to block 45 to end the batch in the modules 16. In addition, if a PipeOutputSet is defined the contents of the PipeTupleSet is written to the data store. The logic then returns to block 34 to function as described above.

If it is determined at decision diamond 38 that all tuple sets (PipeTuplesSets) have been processed, the logic moves to block 46 to end all pipeline components. This can include generating a database commit to write the pipeline results to persistent storage (e.g., the data store 12).

Decision diamond 48 simply indicates that if more pipe queries are forthcoming, the logic may loop back to block 32 to proceed as described for the new queries. Otherwise, the logic ends until the next processing cycle.

It is to be understood that in accordance with the present invention, the above-explained control flow managed by the pipeline core is facilitated by each component implementing a component specific interface to be used inside the pipeline 14, e.g., a PipeModule must implement the PipeModule_Int interface. Implementing this interface, the appropriate methods of the PipeModule will be called at the steps indicated in FIG. 2. Inside the method body, the PipeModule can do whatever is necessary to achieve its task. Thus, flexibility and extensibility are facilitated.

The important method calls for the key interfaces are explained below. Conventional methods, e.g. setting a debug code, getting the module name, etc. are not included.

Accordingly, FIG. 3 shows the input interface (Input_Int) 26, which is used by an element 20 of the storage for tuple sets module 18 to map data elements such as tuples from the data store 12 into the pipeline. As shown, the tuple input interface 26 includes various commands which will be defined in the implementing class. These commands include a command to get the next tuple set ("getNextTupleSet"), e.g., the tuple set associated with an SQL result set. In the case of a PipeInputSet this will be the next PipeTupleSet (34 in FIG. 2). As other examples, it can deliver the correct tuple that might be requested by a processing module for calculating a running mean, i.e., for context-based access.

Other important commands in this interface include initializing the input set ("initComponent", see 32 in FIG. 2), e.g. for a PipeTupleSet which reads data incrementally. This could, for instance, trigger to read the last valid timestamp from an external database table. The last valid timestamp can be pulled from a database using this command. Also, the interface may include ending a tuple set ("endComponet", see 46 in FIG. 2), which invokes a cleanup operation including a database commit. For example, for the PipeInputTupleSet this command could be used to write a timestamp back to a database. This timestamp indicates up to which store time stamp all data has been processed. Also, the interface can include code for determining whether there are any further queries to run ("moreQueriesToRun", see 48 in FIG. 2) and determining whether multiple queries are required ("multipleQueriesAreRequired") to support multiple transaction blocks during one pipeline run as might be used, e.g., by the PipeInputSet. Other non-limiting exemplary commands are shown in FIG. 3 for illustration purposes.

FIG. 4, on the other hand, shows the details of the output set interface 28 that is used by an element 20 of the storage for tuple sets module 18 to map data elements back into the data store 12. This interface includes commands to write a tuple to a location ("writeTuple"), e.g., to write the current tuples stored in the PipeTupleSet back to the external data store, e.g., using an UPDATE or INSERT command based on key columns. The interface in FIG. 4 can also include a command to initialize the output set ("initComponent", see 32 in FIG. 2) as set forth above, and a command to end the output set ("endComponent", see 46 in FIG. 2), e.g. to invoke the cleanup operation mentioned above, or, to write mean tuples back to the data store. Other non-limiting exemplary commands are shown in FIG. 4 for illustration purposes.

FIG. 5 shows the pipe module interface which is used to allow the pipeline element 20 to communicate with the PipeModules 14. The interface of FIG. 5 includes an execute command that does the processing for a processing module, including requesting appropriate tuples such as the correct intermediate results that might be needed from the storage for tuple sets. The interface also includes commands for initialization of the PipeModule (initComponent, see 32 in FIG. 2), clean-up of the PipeModule (endComponent, see 46 of FIG. 2), starting (see 39 of FIG. 2) and ending (see 45 of FIG. 2) a cycle/batch as discussed above.

FIG. 6 shows the tuple set interface (TupleSet_Int) 24, which defines the data exchange between the processing modules 20 and the memory representation included in the elements of the StorageForTupleSets. The interface 24 includes commands to get meta information such as column names, e.g., attribute names and attribute types. The interface 24 may also include commands to add a new tuple to the set, as well as the commands "cursorToFirst( )", "hasNext( )", and "getNext( )" that function as iterators to access elements contained in the set.

Figure 7:
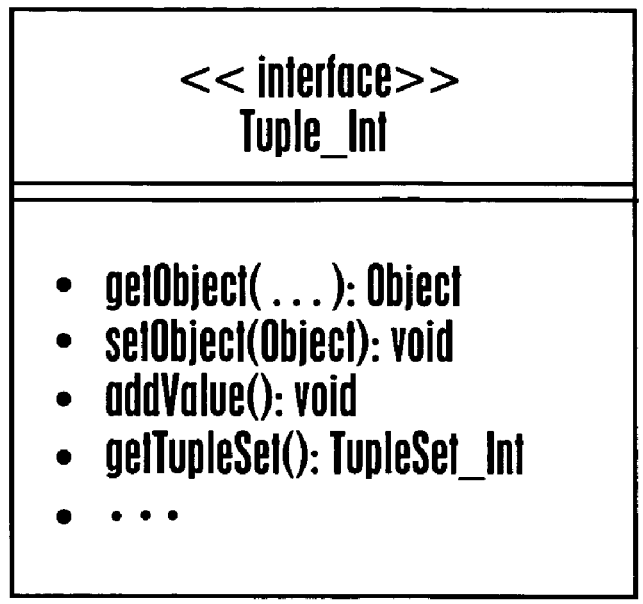
FIG. 7 shows the tuple interface.

Each tuple also has an interface 50 shown in FIG. 7 that, among other things, gets attributes (getObject), sets attributes (setObject) of the tuple, and adds attributes to the tuple (addValue). The interface of FIG. 7 also includes "getTupleSet", a reference to the TupleSet_Int in which the tuple is contained.

Figure 8:
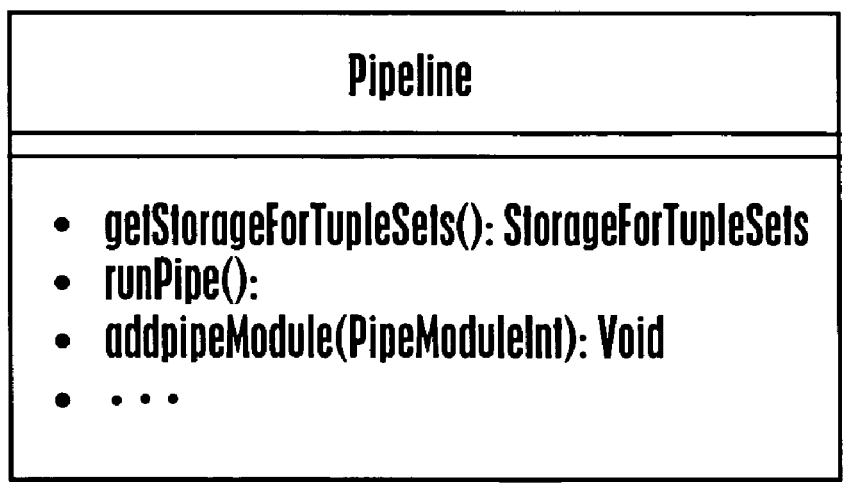
FIG. 8 shows the pipeline class.

Each PipeModule has a reference to the pipeline in which it is contained. Important methods to explain the control logic are shown in FIG. 8. These are method calls to add PipeModules, get access to the StorageOfTuplesSets, run the Pipeline, etc.

To illustrate the above system 10 in specific non-limiting implementations, the examples below are provided.

EXAMPLE

The two examples described below show potential pipeline configurations. These examples help to get an initial understanding of the underlying design principle. For ease of exposition these examples are simplified.

Figure 9:
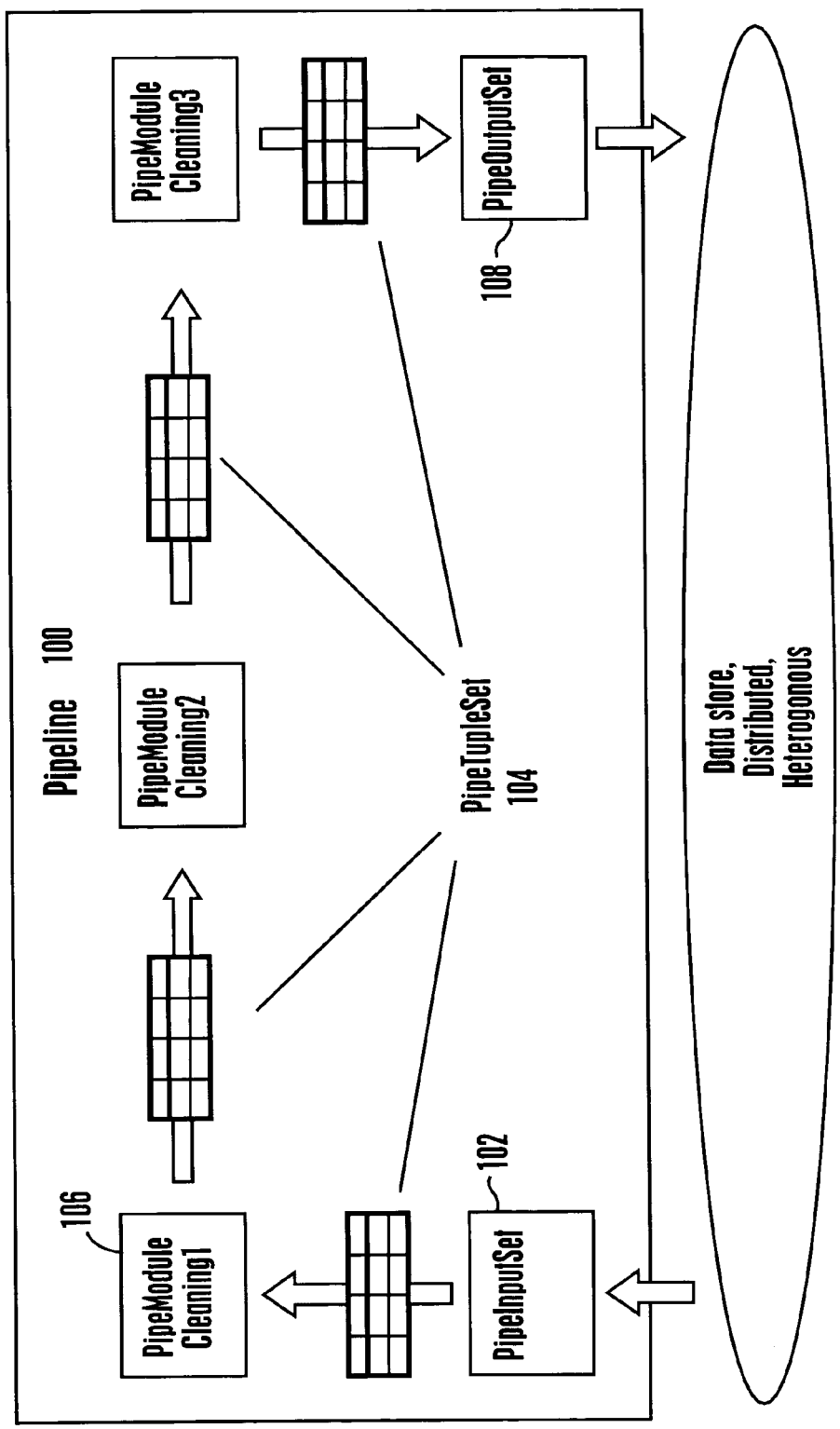
FIG. 9 shows a pipeline example data transfer pipeline.

FIG. 9 shows a data transfer pipeline 100 which transfers data from one data location to another data location. In addition, the transferred data could be cleaned, e.g. by modifying outliers. The data locations could be relational database tables residing in the same or in different databases. The input and the output tables could be identical. Other data locations, e.g. files, data sockets etc. are possible, too.

A PipeInputSet 102 defines the complete data set which will be processed by the pipeline. For a relational database this data set could be determined by an SQL select statement, e.g. "process all data inserted into the database during the last hour" or all data which matches some condition, etc. The data set to be processed could be very large, e.g. thousands of rows. To optimize the performance of the pipeline 100 the PipeInputSet can control the amount of data which is pumped through the pipeline during one cycle (batch). For instance, if the PipeInputSet contains 10.000 rows and the PipeInputSet pumped data sets consist of 10 rows through the pipeline during each batch, the pipeline would run for 1000 cycles. The PipeInputSet generates for each cycle a PipeTupleSet 104 which is pumped through all pipeline modules.

The PipeTupleSet 104 can have a table-like structure including meta information (e.g. column names and column types) and data rows. New columns and rows can be added. If the PipeInputSet reaches a PipeModule 106 the module will use the contents of the PipeTupleSet to perform its task. In the example shown in FIG. 9 all PipeModules access only data contained in the PipeTupleSet to perform cleaning operations. As examples, PipeModule Cleaning1 could check the values of column 1 of the PipeTupleSet and if the value is an outlier it could change its value or mark it as an outlier in other columns. The PipeModule Cleaning2 and Cleaning3 could perform similar operations on different columns of the PipeTupleSet.

If the PipeTupleSet reaches a PipeOutputeSet 108, the contents of the PipeTuplesSet are written to the data destination. In the case of a relational database data table this could trigger SQL update or insert statements depending on key columns defined for the PipeOutputSet.

After the PipeTupleSet is pumped through the whole pipeline, the PipeInputSet generates the next PipeTupleSet. The PipeInputSet offers additional method calls, e.g. to support transaction blocks, e.g. if 100 PipeTupleSets are processed a commit transaction could be executed.

Figure 10:
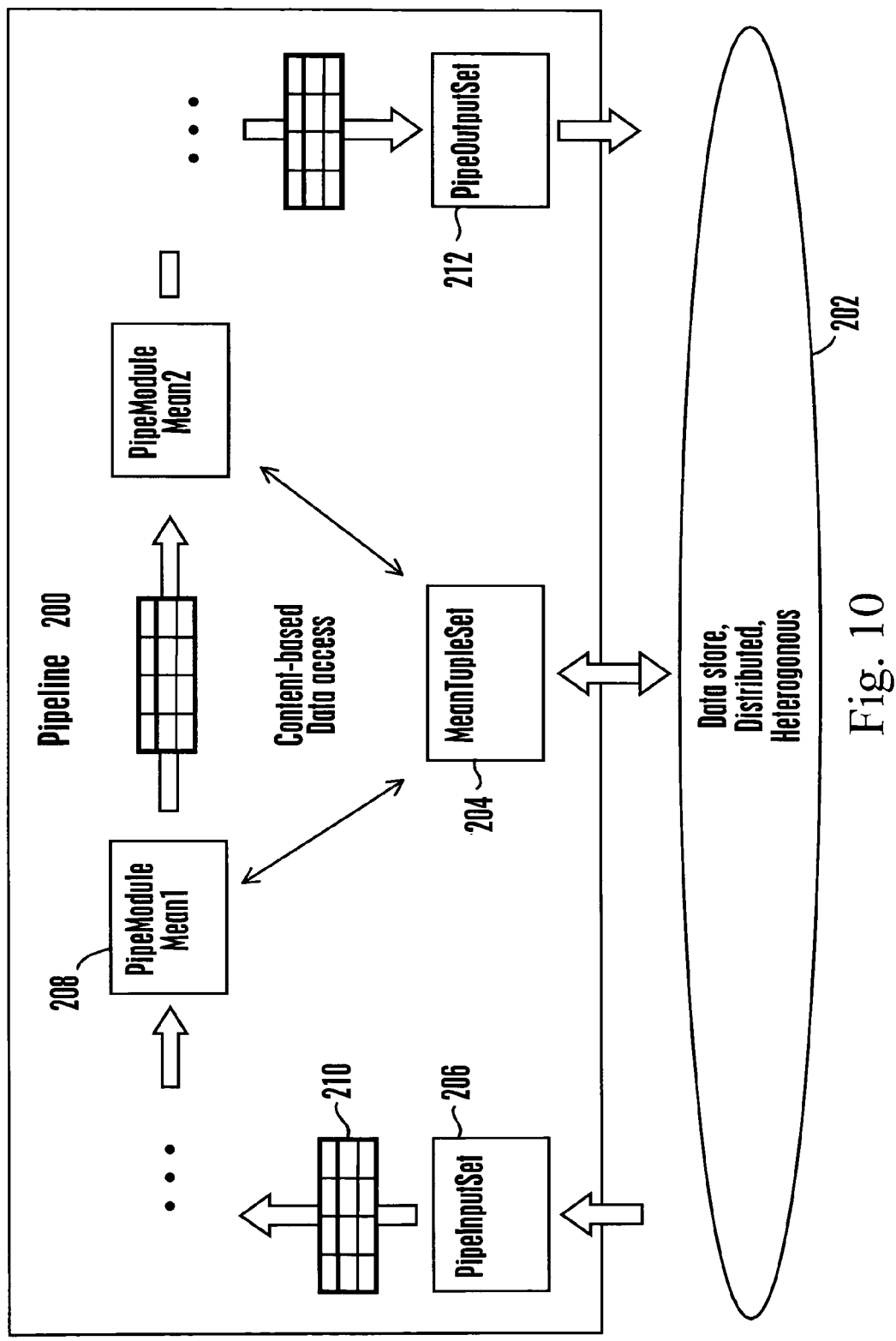
FIG. 10 shows a pipeline example mean computation pipeline.

FIG. 10 shows an example pipeline 200 for incremental mean computation. The current mean values are stored in a data store 202, e.g. a relational database table. If the pipeline runs, the new raw data together with the current mean values is used to compute the new mean value. At the end of the pipeline run these values are written back to the data store. They will be used as new current mean values for the next execution of the pipeline.

To access the mean table a MeanTupleSet 204 is defined. This set manages the data mapping between the pipeline and the external storage. It supports content-based access to the data store. If the pipeline wants to modify the current mean computation for a special group, the MeanTupleSet will deliver it by accessing its memory data cache or by reading the value from the data store.

As in the previous example, a PipeInputSet 206 is responsible to access the data which is pumped through PipeModules 208. In this case the PipeInputSet 206 accesses raw data. This is data for which the mean must be computed. If a PipeTupleSet 210 reaches a mean module 208 (PipeModule Mean1 and Mean2 in FIG. 10), the contents of the tuples of the PipeTupleSet determines which mean group has to be updated. After determining this group the right tuple is requested from the MeanTupleSet (content-based) and updated. The MeanTupleSet 204 keeps the updated values in its cache. Thus, fast access is possible, if this tuple is needed again. As shown in FIG. 10, different PipeModules can use the same MeanTupleSet. A more general name for this type of tupleSet is AttachedTupleSet. If the pipeline triggers a commit of a transaction block, the MeanTupleSet will write its contents back to the data store by updating or inserting the right row. The example of FIG. 10 includes a PipeOutputSet 212. It is to be understood that this is optional. The mean could be computed without a PipeOutputSet defined.

In any case, it may now be appreciated that while FIGS. 9 and 10 show specific non-limiting implementations of the present pipeline system, the present invention provides a much more general framework in which the PipeInputSet, PipeOutputSet and the MeanTupleSet (AttachedTupleSet) all can be elements of a central storage for tuple sets, with each element being tailored for special needs. For example, an AttachedTupleSet could have no mapping to an external storage, and instead could be used as temporary storage (valid only during one pipeline run) and as shared memory between PipeModules.

Preferred GUI Description

Now considering a graphical user interface (GUI) that can be used to configure the pipelines shown above by a user who is not a programmer, reference is made to FIGS. 11-21. The main objective of the graphical user interface (GUI) for the Pipeline architecture is to be able to generate and modify Pipelines without writing any JAVA code apart from the initial core code. In addition, the GUI itself is easily extensible, i.e., new GUI components can be plugged in without touching the already programmed parts of the GUI. This makes the GUI-LevelPipeline a powerful tool.

A CodeLevelPipeline program for pipe generation 300 generates a Pipeline 302 using a JAVA main program (FIG. 11) to access JAVA class files 304. Thus, the pipeline designer can open an editor and write some JAVA code. This main JAVA program mainly defines constants, generates the right objects and starts the execution of the Pipeline.

The GUILevelPipeline offers an extensible graphical user interface (GUI) 310 to define and/or modify Pipelines and a command line option to start/execute already defined Pipelines (FIG. 12). Only one—already existing—JAVA program (PipeGUIX) is needed to define, modify and start all Pipelines.

Figure 13:
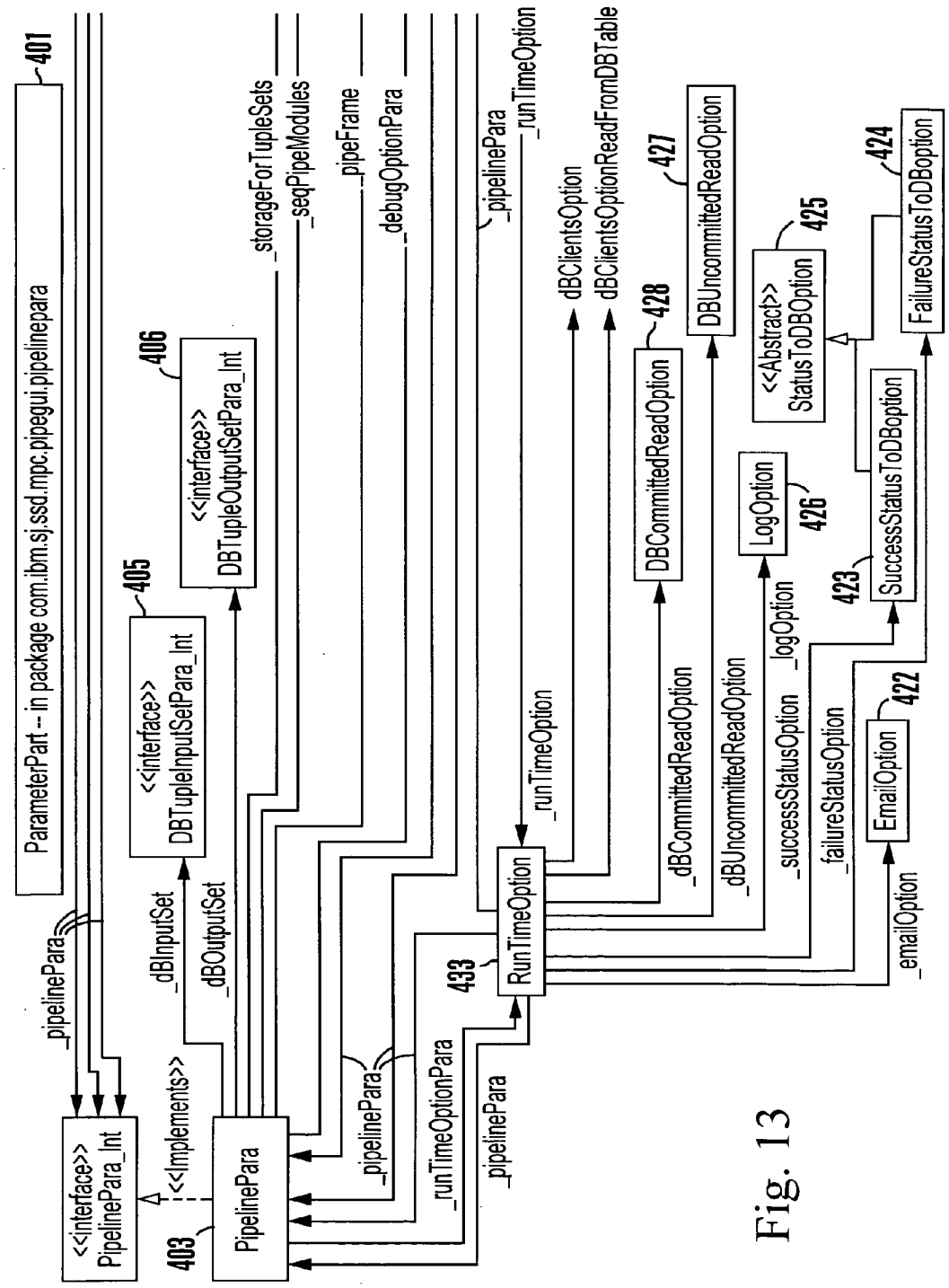
FIG. 13 is a UML diagram showing the core classes of the PipeGUI framework.
Figure 13:
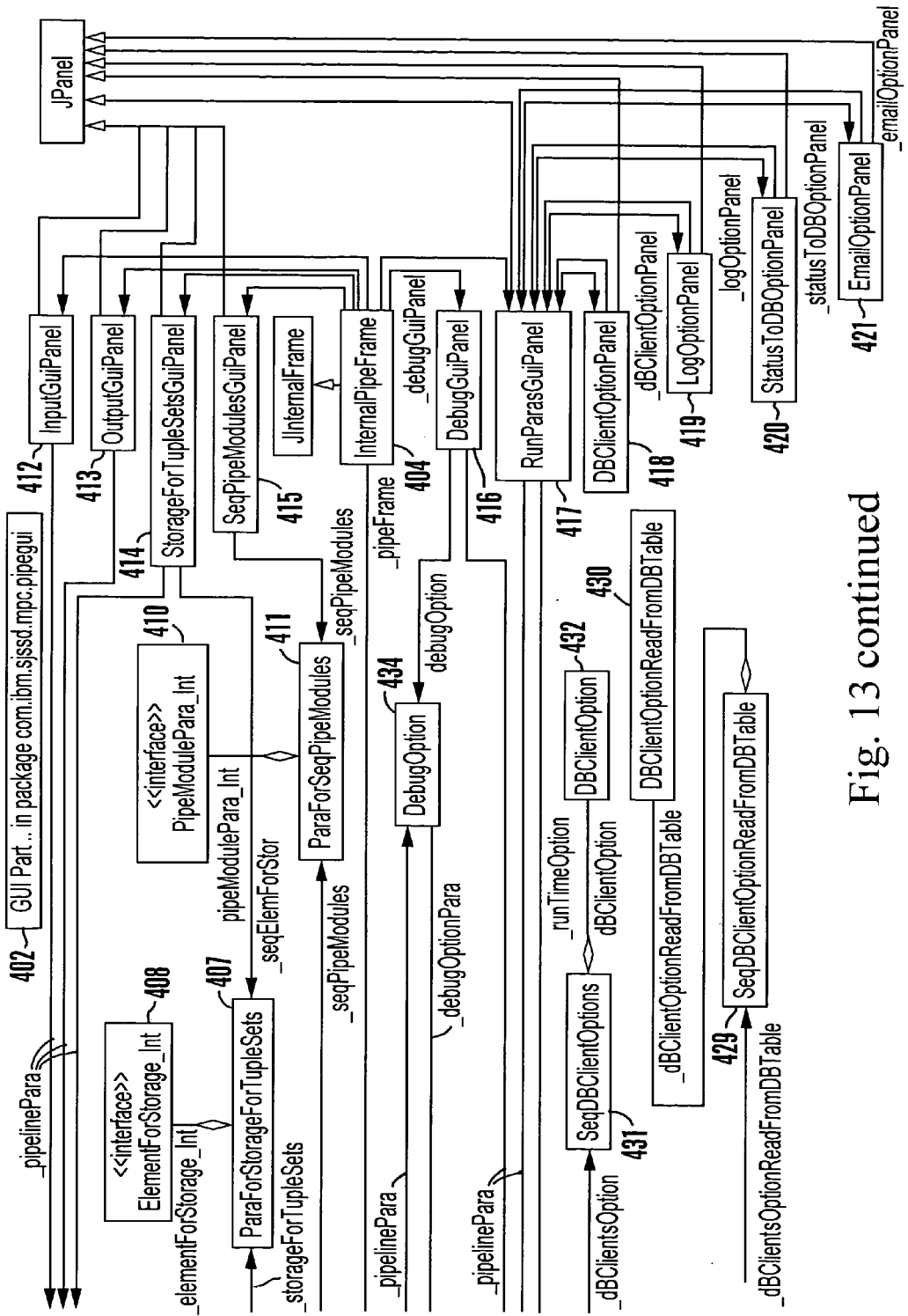

The UML diagram in FIG. 13 shows the core design of the PipeGUI. The GUI is similarly designed as the Pipeline itself shown above. The PipeGUI defines a set of interfaces. Thus, new GUI modules which implement this set can be displayed in the GUI. For each function, the PipeGUI framework contains two parts: a GUI representation part (right half of FIG. 13, see comment at reference numeral 402) and a storage part (left part of FIG. 13, see comment at number 401). The GUI part defines how something is displayed and the storage part defines how the GUI parameters are stored in an external storage (compare to FIG. 12).

The PipelinePara class (reference numeral 403 in FIG. 13) offers access to all stored parameters which are used to build the GUI. Of course, this class itself can't know all the details by itself, as a mean module needs different parameters than a filter module. The PipelinePara class (reference numeral 403 in FIG. 13) accesses this information via well defined interfaces: DBTupleInputSetPara_Int (reference numeral 405 in FIG. 13) for the PipeInputSet, DBTupleOutputSetPara_Int (reference numeral 406 in FIG. 13) for the PipeOutputSet, ParaForStorageForTupleSets and ElementForStorage_Int (reference numerals 407 and 408 in FIG. 13) for the StorageForTupleSets and ParaForSeqPipeModules and PipeModulePara_Int (reference numerals 411 and 410 in FIG. 13) for the PipeModules.

The GUI counter part for the PipelinePara class (reference numeral 403 in FIG. 13) is the InternalPipeFrame class (reference numeral 404 in FIG. 13). This class generates panels for input (reference numeral 412 in FIG. 13), output (reference numeral 413 in FIG. 13), a set of AttachedTupleSets (reference numeral 414 in FIG. 13) and a sequence of PipeModules (reference numeral 415 in FIG. 13). These panels do not define the GUI representation of a specific class. Instead, the contents of these GUI panels are determined when a user adds a specific class for a specific task, e.g. a mean module, to the sequence of pipeline modules.

The separation between GUI representation and storage representation is also valid for all debug parameters (reference numerals 416 and 434 in FIG. 13) and run-time parameters (reference numerals 417 to 433 in FIG. 13) which can be passed to the pipeline during execution time.

Figure 14:
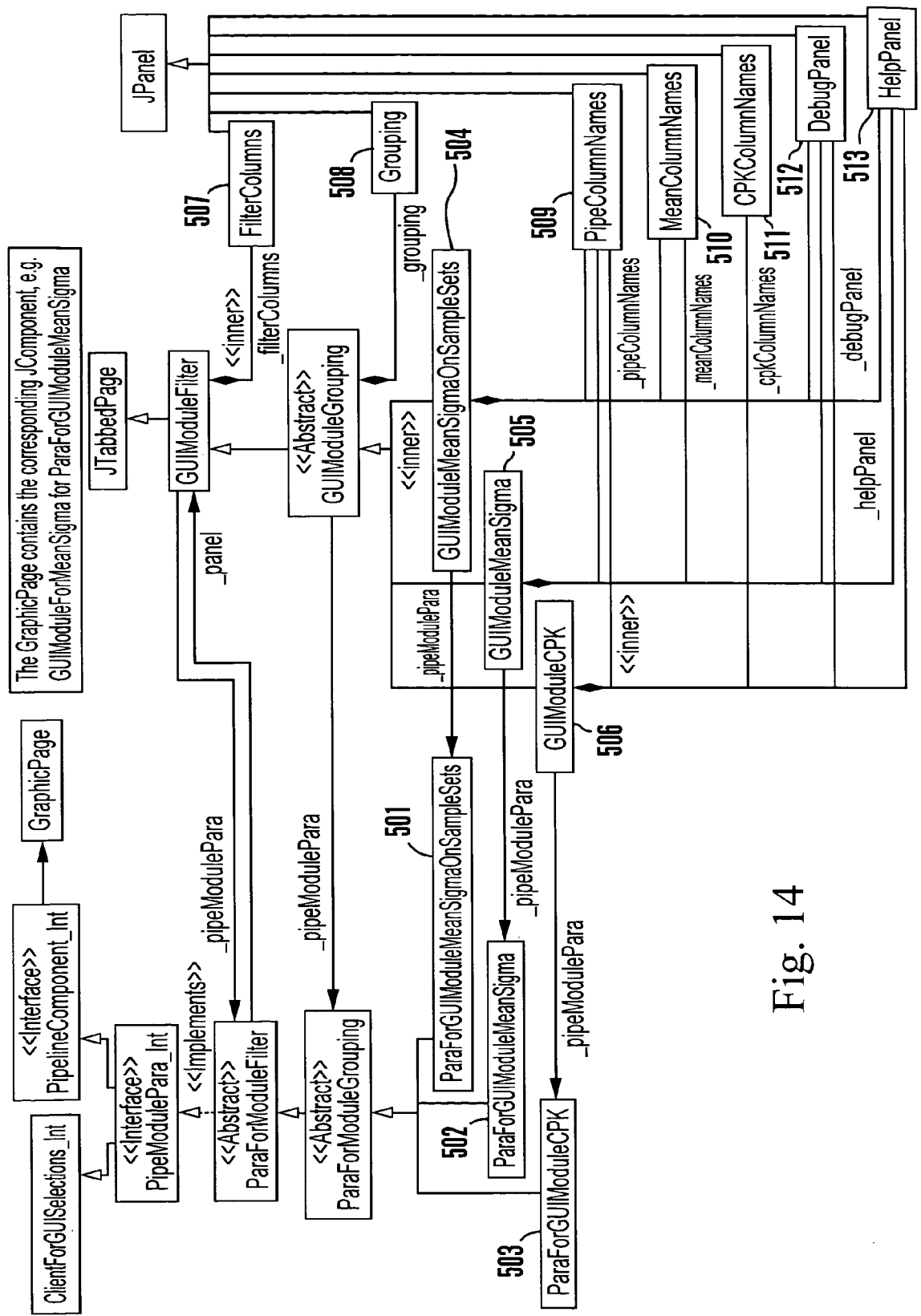
FIG. 14 is a UML diagram showing an implementation of the parameter classes of the PipeModules.

To further demonstrate the design, some classes implementing the PipeModulePara_Int (reference numeral 410 in FIG. 13) are shown in FIG. 14. Implementations of the other parameter classes, e.g. of DBTuplInputSetPara_Int (reference numeral 405 in FIG. 13), will look similar.

FIG. 14 shows parameter classes for three different PipeModulePara_Int implementations: ParaForGUIModuleMeanSigmaOnSampleSets (reference numeral 501 in FIG. 14), ParaForGUIModuleMeanSigma (reference numeral 502 in FIG. 14) and ParaForGUIModuleCPK (reference numeral 503 in FIG. 14). The corresponding GUI classes (reference numerals 504 to 506 in FIG. 14) will generate the real GUI pages for theses classes. In a set of GUI panels (reference numerals 507 to 513 in FIG. 14) different parameters are displayed, e.g., for a mean module this could be filter parameters, grouping parameters defining the mean grouping, and the name of the columns in the PipeTupleSet which are used for the mean computation. To read a pipeline out of the external memory, to generate the right objects and to display the right GUI pages, JAVA reflection is heavily used. Thus, classes can be generated using the class name only. This name doesn't have to be known during the writing and compilation of the code. Thus, new pipeline components (e.g., processing modules, input modules, output modules, each of which can support GUI, storage, and processing parts) can be integrated into the PipeGUI without touching or recompiling the existing code. Only a configuration file must be modified, containing the class names of the available classes.

To run a pipeline and a PipeGUI, real classes must be implemented. Below is an example for implemented classes proving the flexibility and efficiency of the pipeline:

Input Modules
 a. general select statement Arbitrary select statements are supported (result set could be big).
 b. general select statement with intermittent commit commit is issued after n tuples are processed (status column is needed)
 c. general select statement with automatic time condition incremental fetching according to last pulling date; fetching in blocks up to current timestamp or older timestamp (good for rework); intermittent commit Output Modules
 a. general insert/update module Insert/update according to pipe key columns (automatically); update is tried first; if no update is possible, an insert is issued; pipeline key columns should be keys in the DB table Pipe Modules
 a. mean sigma Computes mean based on raw input (input sample size 1); arbitrary grouping, e.g. by product, tool, day; can be used for histogram; mean sigma for sample set; computes mean based on mean input (variable sample size); arbitrary grouping (can be used for histogram).
 b. mean sigma based on count and/or time interval arbitrary grouping;
 different options:
  computes mean based on fixed sample size
  computes mean based on fixed time intervals
  computes mean based on minimum sample size and fixed time intervals; (results are carried over if sample size too small)
 c. CPK computes CPK based on already computed mean values; specs are read from an external spec table
 d. narrow to wide transforms a narrow input table to a wide output table
 e. Min Max values determines values associated with min and max times; (min/max times are computed by group module); computes the min and max values based on grouping
 f. database commands Executes arbitrary SQL commands against DB, e.g., delete from

GUI EXAMPLES

Figure 15:
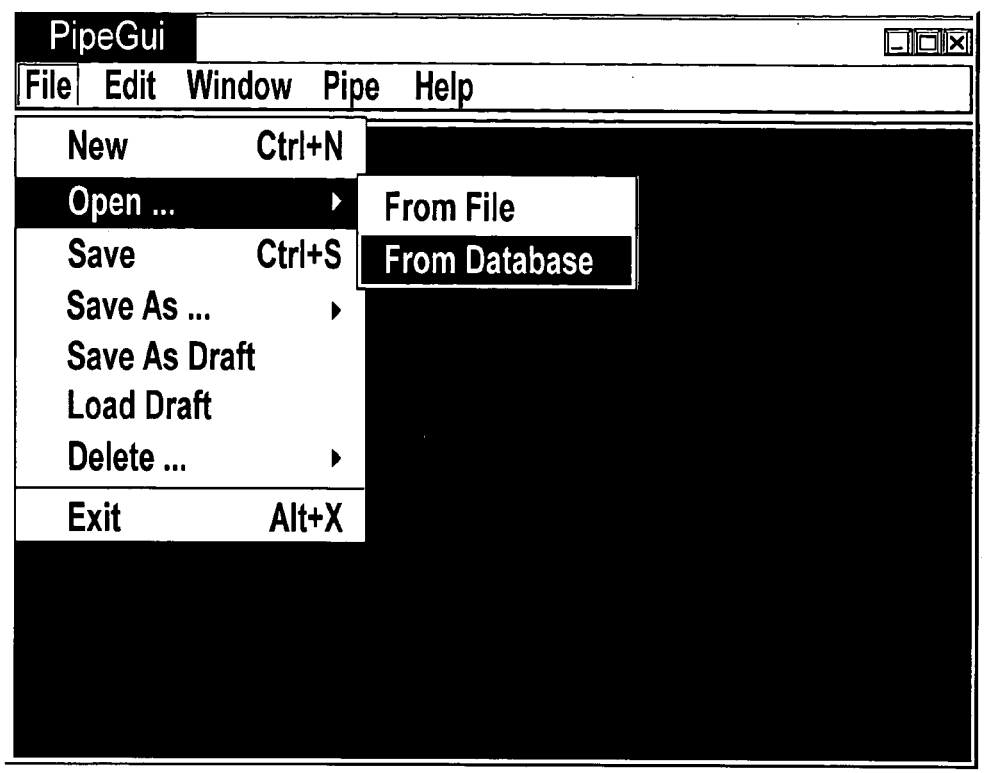
FIG. 15 is a screen shot of the root frame window of the GUI.

Once the GUI is started a root frame pops up. FIG. 15 shows the root frame with the File menu opened. The file menu contains items to generate a new pipeline, open an existing one, save a selected one and delete already stored pipelines. Pipline parameters can be stored in a file or a database.

The Edit menu contains standard options for copy, paste and cut. The Window menu offers standard commands to cascade the sub-frames contained inside the root frame. The Help menu contains help for the root frame.

The Pipe menu offers a command to generate a pipeline. This commands checks whether a pipeline can be generated using all parameters specified in the GUI. Real pipelines are generated. The second command offers the generation and the subsequent execution of the pipeline. This is very helpful during the development of the pipeline. Once a pipeline is saved, it can be executed via command line parameters without using the GUI.

The root frame is a start-up screen and is always the same. All subsequent GUI pages are examples of implementations of some interfaces. New implementations can be added to the GUI without recompiling the existing code. In the preferred implementation Java-reflection is used for this purpose. The new classes implementing some interface must be added only into a configuration file.

Figure 16:
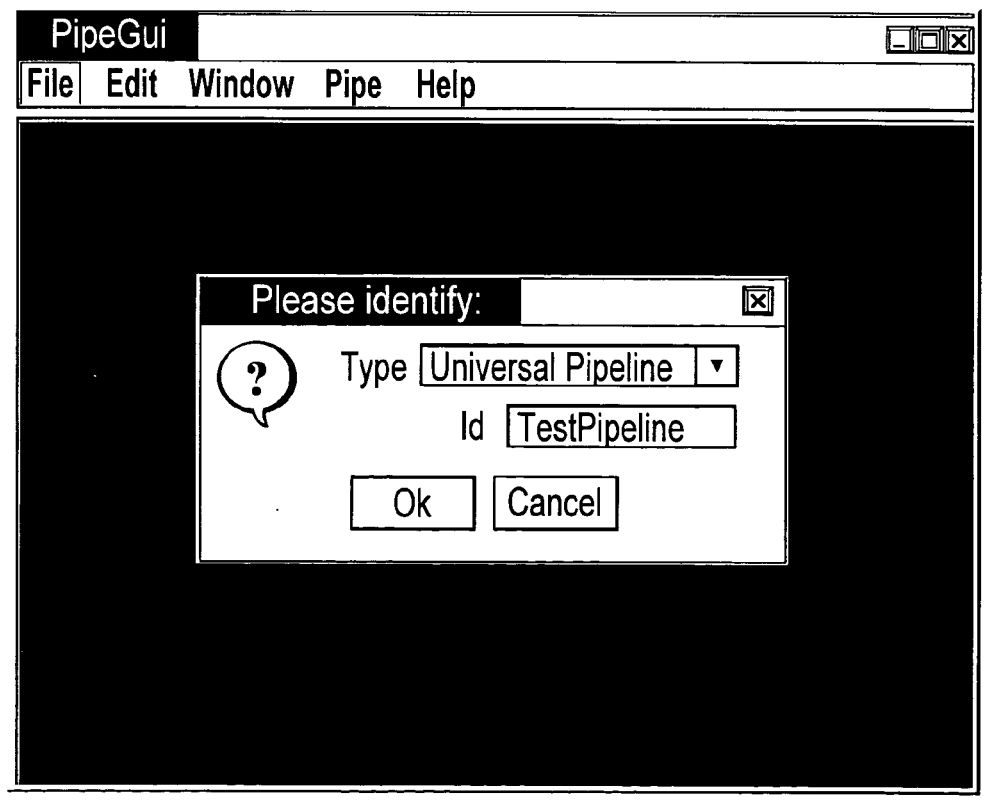
FIG. 16 is a screen shot illustrating the selection of pipeline type when generating a new pipeline.

If it is desired to generate a new pipeline, File->New is selected and the window shown in FIG. 16 appears. After selecting the pipeline type (in this case Universal\Pipeline), the internal frame associated with this pipeline type is generated. The Universal Pipeline type reflects a one to one translation of the underlying pipeline architecture described in the non-GUI sections. Selecting the Universal Pipeline type, the corresponding class is read form the configuration file and an instance is generated by Java reflection.

It is to be understood that beside the Universal Pipeline type other types are possible, e.g. a GUI for a special pipeline using a predefined PipeInputSet (thus, the GUI doesn't offer to define a PipeInputSet). This GUI could be used for inexperienced users reading data from a fixed table. This simplified GUI can hide complexity. However the underlying pipeline generated by the GUI could use the same non-GUI pipeline components as the Universal Pipeline.

The internal frame with the title PipeId: TestPipeline shows several tabs on the top (see FIG. 17): Run Parameters, Pipe Input Set, Pipe OutputSet, Storage For TupleSets, PipeModules and Debug Codes.

Figure 17:
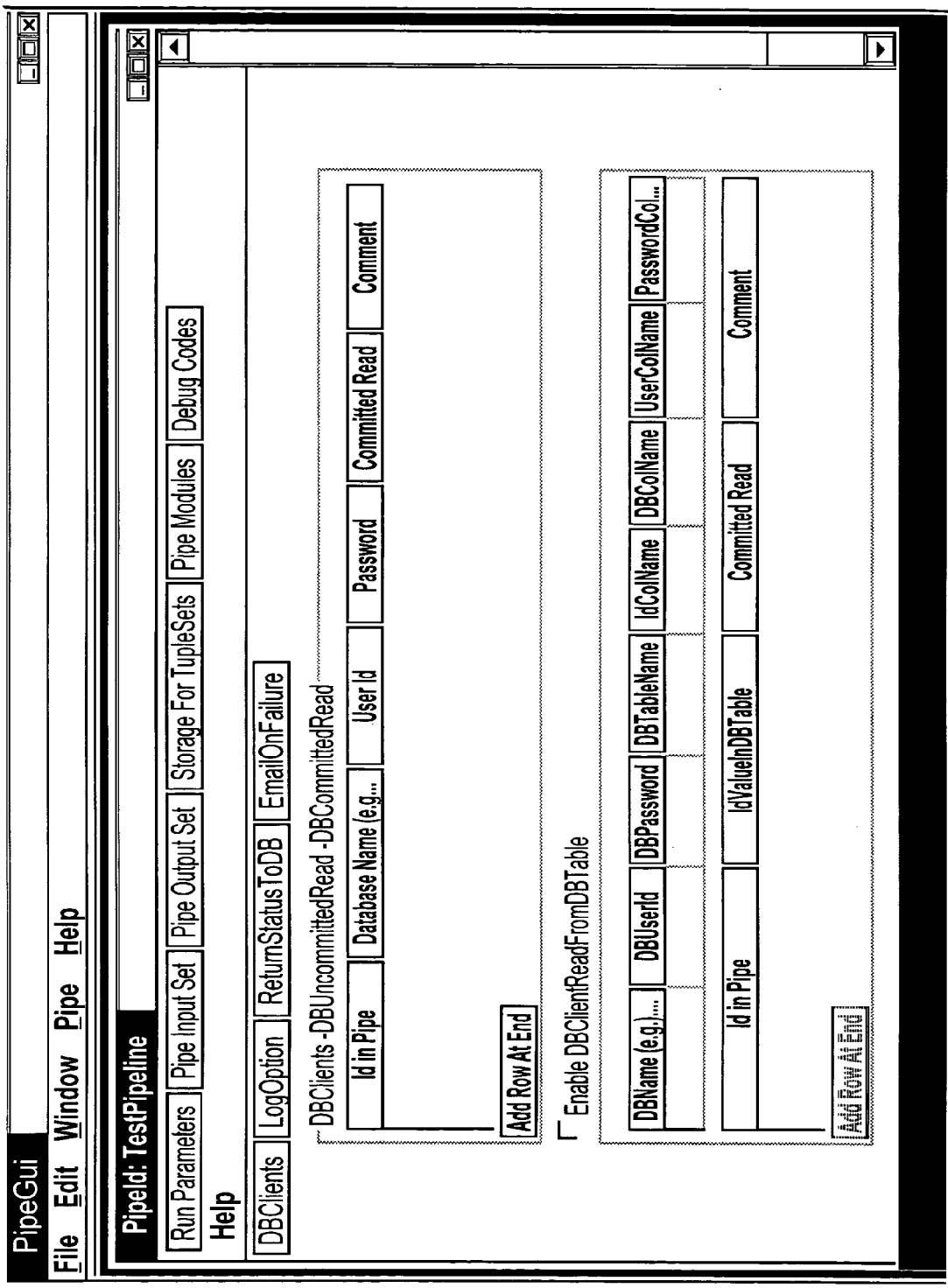
FIG. 17 is a screen shot showing the internal frame for the pipeline.
Figure 18:
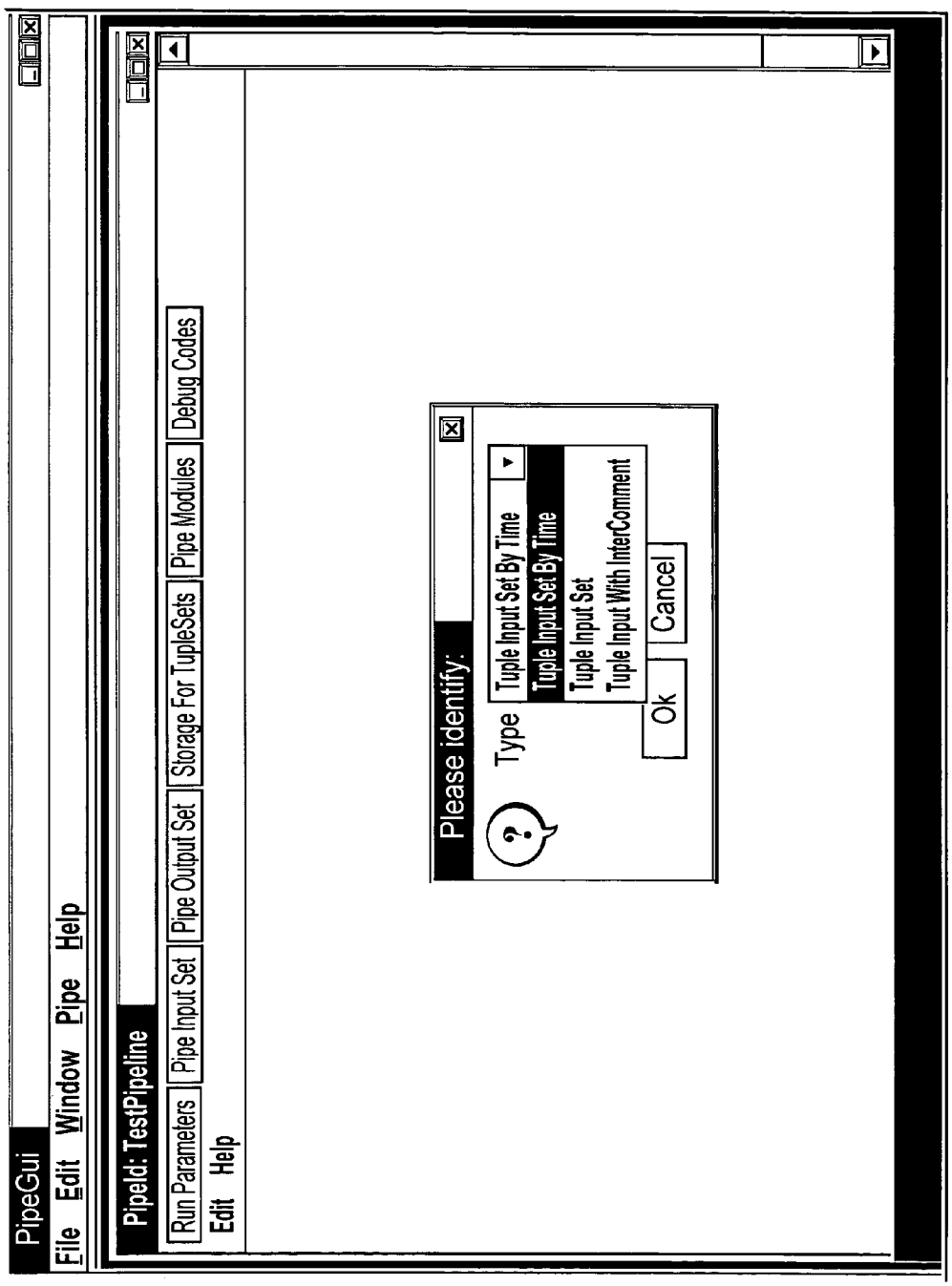
FIG. 18 is a screen shot illustrating a PipeInputSet type with Tuple Input Set by Time selected.

The Run Parameters tab displayed in FIG. 17 contains its own tabs: DBClients (shown in the figure) to define database connections (if needed), LogOption to generate log information, ReturnStatusToDB to write the return status (success or failure) of the execution of the pipeline back to a database and EmailOnFailure to send an email, if the execution of the pipeline fails.

Figure 19:
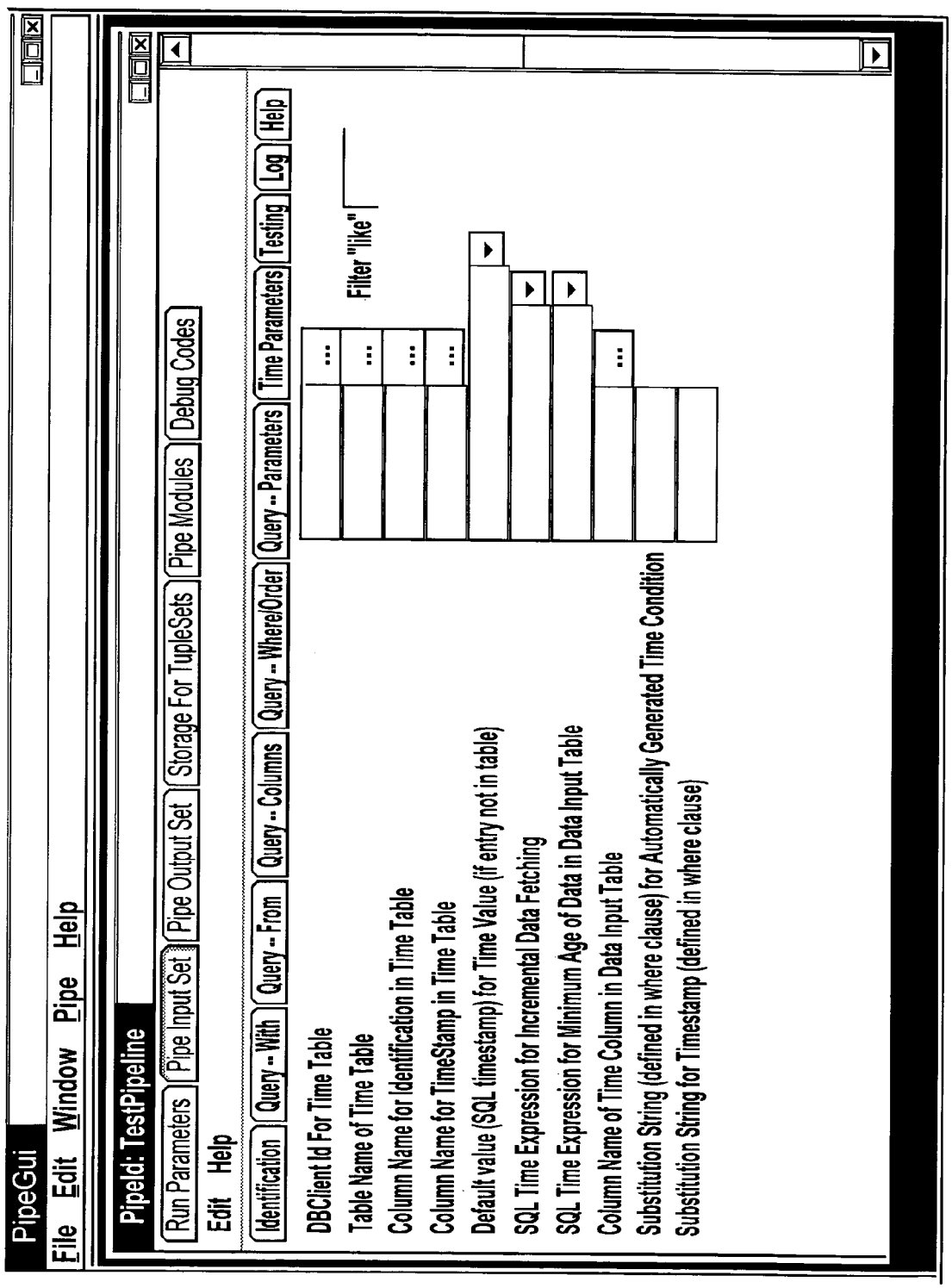
FIG. 19 is a screen shot of an example of the Pipe Input Set tab.

Using the Pipe Input Set tab of the internal frame and selecting and Edit->New, a window pops up to define a new PipeInputSet. Different potential types are offered. The Tuple Input Set By Time type (FIG. 18), for instance, may be selected. The selected type determines what kind of GUI will appear inside the Pipe Input Set tab (FIG. 19). The general process to generate this class specific GUI is similar to the generation of the internal frame of the Universal Pipeline: the selected type is translated via a configuration file to a class, and using Java reflection an instance of this class is generated and this instance produces the GUI Page.

The GUI for the Tuple Input Set By Time type (FIG. 19) offers several tabs to specify different parameters. Only the Time Parameters tab is shown in this figure. The parameters contained in all tabs are finally used during the execution of the pipeline to generate SQL statements which will pull data incrementally from a data source. Transaction blocks are supported.

In addition to the Pipe InputSettab, the Universal Pipeline (see FIG. 17) offers the following additional tabs:

Pipe Output Set tab to define a PipeOutputSet. The user can select from different output set type (similar to the process shown for the PipeInputSet)

Storage For TupleSets tab to define an arbitrary number of elements contained in the StorageForTupleSets. For each element, individual input and output sets can be defined. The process to define the input and output set for each element of the StorageForTupleSets is similar to the definition of the PipeInputSet and PipeOutputSet for the Universal Pipeline (see example below, FIG. 21).

Pipe Modules Tab to define an arbitrary number of PipeModules. For each PipeModule, a type is selected during generation. This type defines the GUI. The process is similar to the selection of the PipeInputSet for the Universal Pipeline.

Debug Codes tab debug codes for the Universal Pipeline, e.g. print information when commit is issued, which module is processed, etc.

Figure 21:
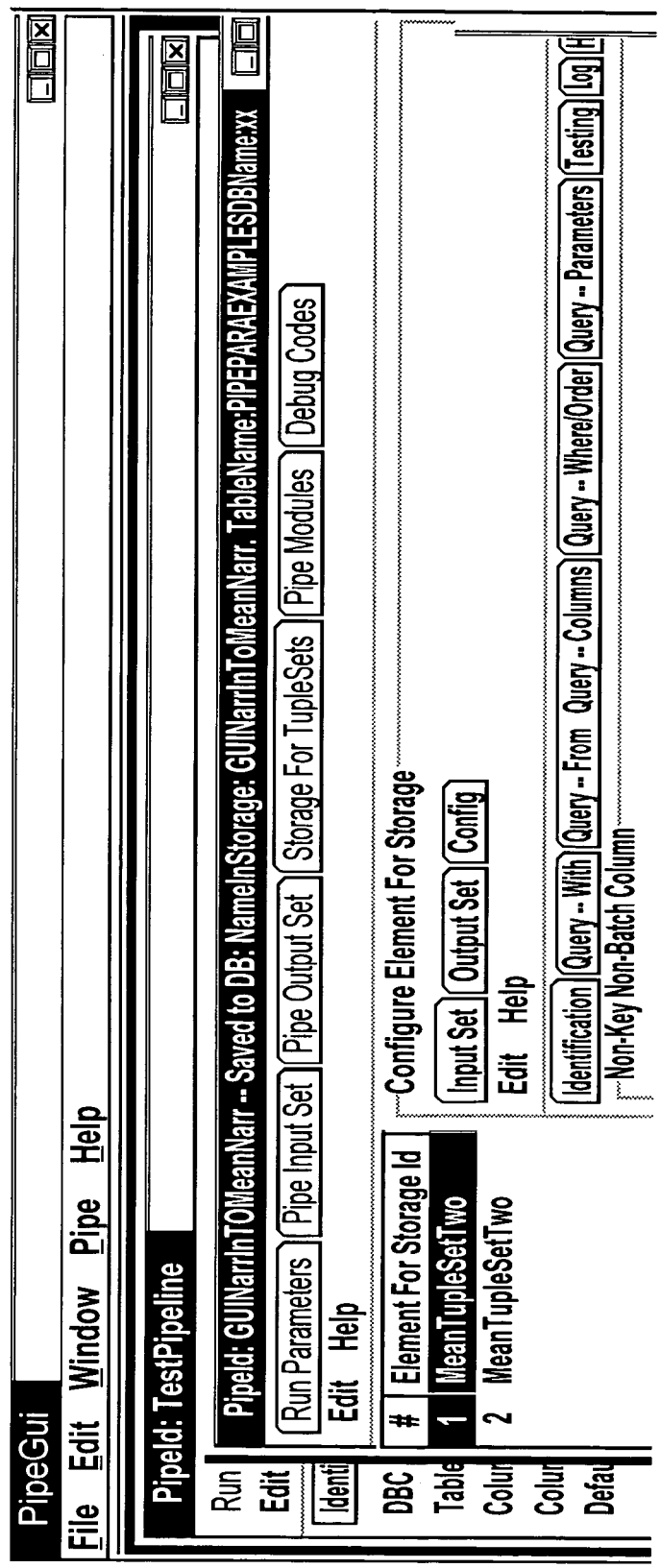
FIG. 21 is a screen shot showing an example of a Pipe Modules tab containing three pipe modules.

Using the pipeline GUI, multiple pipelines can be modified simultaneously. To do this, the user may select File->Open->From Database, then select a pipeline name and an existing pipeline is loaded. Its GUI will appear as an additional internal frame (in this case the frame has the title PipeId: GUIXNarrInToNarrMean¼.) FIG. 21 shows the Storage For TupleSets tab.

The StorageForTupleSets contains two elements, namely, MeanTupleSet and MeanTupleSetTwo (see left table). The element MeanTupleSet can be selected and the Query Columns Tab of the Input Set is shown.

Figure 20:
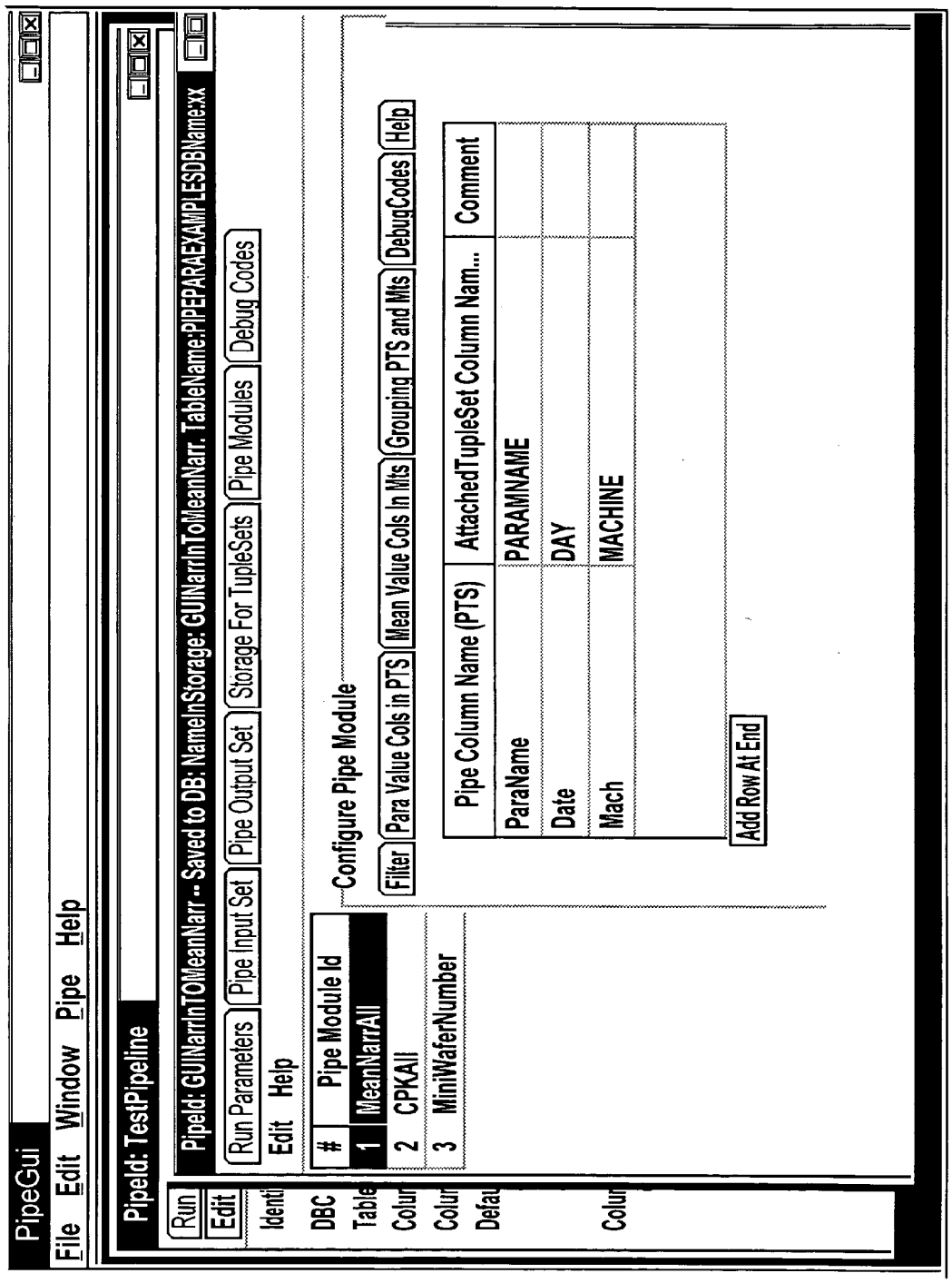
FIG. 20 is a screen shot of an additional internal frame for displaying the GUI of another pipeline, with the StorageForTupleSets tab selected.

FIG. 20 shows the Pipe Modules tab containing three PipeModules: MeanNarrAll to compute a mean, CPKAll to compute a CPK and MinWaferNumber to determine the smallest wafer number. All modules are of a different type. Each module generates its own GUI (recall that a pipe module type determines the class using a configuration file), the class is instantiated using Java reflection, etc.). In this figure the MeanNarrAll module is selected and its Grouping PTS and MTS tab is shown. This tab determines which grouping is used for the mean computation. In addition, the mapping of the grouping column names between the PipeTupleSet columns and the MeanTupleSet columns is defined.

Users of the GUIPipe can write/program their own GUIComponents and PipeComponents (implementing the appropriate interfaces) and compile them, e.g., processing modules, input modules, output modules, and the accompanying GUI, storage, and processing parts. And, users can make these modules available inside the GUI by changing only a configuration file—no editing/compilation of existing code is necessary. Thus, users distributed all over the world can contribute in extending the existing pipeline. These users can extend the functionality of the pipeline by adding new component types, which entails encoding the interfaces using JAVA code and adding the new object type to the configuration file. In addition, users can generate arbitrary pipelines using already programmed components (known types) by parameterizing them via the GUI, which does not include any new JAVA programming. Thus, there is a difference between contributing to Pipeline components (component types) and using the components to make an arbitrary number of pipelines. Experienced users can extend the pipeline component types, while relatively inexperienced users can generate powerful pipelines using existing component types. In either case, the core JAVA code of the underlying pipeline does not require modification; instead, at most the configuration file is updated with a new type but owing to JAVA reflection no recompilation is necessary.

While the particular GUI FOR DATA PIPELINE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A graphical user interface (GUI) for configuring pipelines, the GUI displayable on a user computer monitor and stored on a computer memory and comprising:
   at least one pipe input set window configured to permit a user to define a type of pipe input set data;
   at least one GUI page based on the type, the GUI page being generated by translating the type using a configuration file to a class and using Java reflection to generate an instance of the class, the instance producing the GUI page; and
   using the GUI page to configure a data pipeline, and the GUI further comprising at least one Pipe Output Set tab for defining PipeOutputSet representative of a type of output data from the pipeline.

2. The GUI of claim 1, wherein at least the pipe input set window and GUI page require no programming apart from an initial core code.

3. The GUI of claim 1, wherein the GUI is an incremental GUI wherein GUI pages for new pipe components can be added incrementally without changing existing code.

4. The GUI of claim 3, wherein at least one new pipe module is based on a pre-existing module type.

5. The GUI of claim 3, wherein at least one new pipe module is based on a new user-defined component type.

6. The GUI of claim 1, wherein the GUI defines a set of interfaces, each interface including plural functions, the GUI including a GUI representation part and a storage part, the GUI representation part defining how something is displayed and the storage part defining how GUI parameters are stored in an external storage.

* * * * *